United States Patent [19]

Naive

[11] 3,761,740

[45] Sept. 25, 1973

[54] FREQUENCY DETECTOR

[75] Inventor: Joel A. Naive, LaJolla, Calif.

[73] Assignee: Wavetek, San Diego, Calif.

[22] Filed: June 23, 1972

[21] Appl. No.: 265,584

Related U.S. Application Data

[63] Continuation of Ser. No. 134,957, April 19, 1971, abandoned.

[52] U.S. Cl. .............. 307/233, 307/232, 307/235 A, 307/236, 307/218, 307/251, 328/140, 328/155

[51] Int. Cl. .............................................. H03k 5/20

[58] Field of Search .................... 328/105, 106, 134, 328/140, 141, 153, 155; 307/232, 233, 218, 251, 235

[56] References Cited

UNITED STATES PATENTS

| | | | |
|---|---|---|---|
| 2,708,718 | 5/1955 | Weiss | 328/140 X |
| 2,881,320 | 4/1959 | Goldberg | 328/155 X |
| 3,054,062 | 9/1962 | Vonarburg | 328/134 X |
| 3,131,363 | 4/1964 | Landee et al. | 328/155 X |
| 3,641,447 | 2/1972 | Gaines et al. | 328/134 X |

*Primary Examiner*—John S. Heyman
*Attorney*—Ellsworth R. Roston

[57] ABSTRACT

This invention relates to a system for detecting the presence of a signal having a specified frequency. The input signal is subjected to a plurality of detector stages, each comprised of an electronic switch and a capacitor. The control signals applied to the detector stages are at the frequency to be detected. Each stage has a particular phase displacement relative to all other stages. When the phase of the input signal substantially coincides with that of one of the detector stages an output signal is produced. The plurality of stages are connected to a network wherein the maximum stage output signal establishes the system output amplitude by means of a majority signal selection technique.

9 Claims, 1 Drawing Figure

PATENTED SEP 25 1973
3,761,740
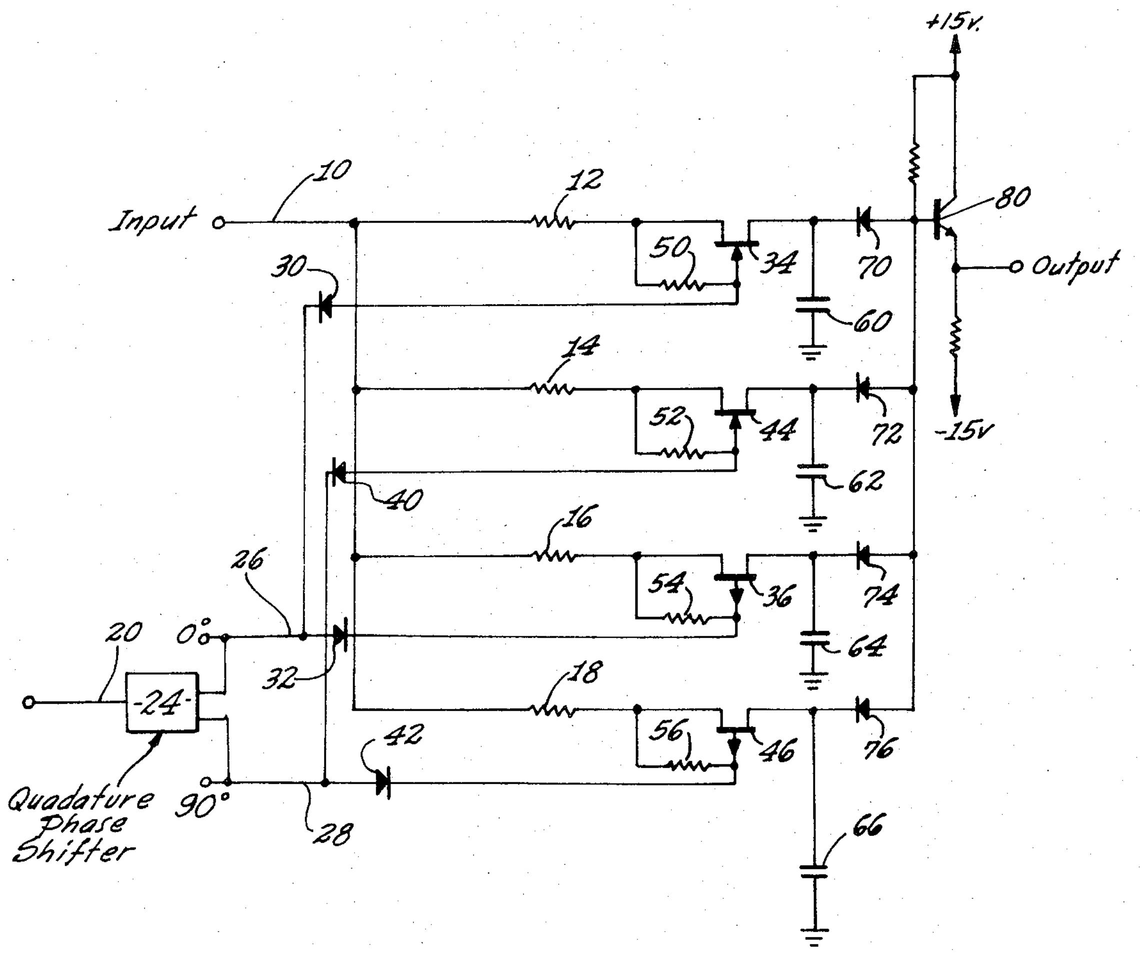
INVENTOR:
Joel A. Naive
By Smyth, Roston & Pavitt
ATTORNEYS

FREQUENCY DETECTOR

This is a continuation of application Ser. No. 134,957 filed Apr. 19, 1971.

This invention relates to a system for determining the frequency of an input signal to determine whether the input signal has a particular frequency. More particularly, the invention relates to a system for providing a control signal having the particular frequency and for operating upon the control and input signals to determine the frequency of the input signal regardless of any differences in phase between the input signal and the control signal.

Systems have been known in the prior art for determining the frequency of an input signal by providing a control signal with a variable frequency and by sweeping the frequency of the control signal to obtain coincidence between the frequencies of the input signal and the control signal. Such systems have had certain disadvantages. These disadvantages have not been able to be cured in spite of considerable attempts to do so.

One primary disadvantage of the systems of the prior art has been that the phases of the input signal and the control signal have varied relative to each other. When the input and control signals have had similar phases, an output signal representing frequency coincidence has been able to be produced. However, when the phase of the input signal has varied considerably from the phase of the control signal, the differences in phase have prevented an output signal from being produced even when the frequencies of the input and control signals have been coincident.

This invention provides a system for overcoming the above difficulties. In the system constituting the invention, an input signal having a variable frequency is provided and a control signal having a particular frequency to be detected is also provided. The control signal is provided with a plurality of phases each having a particular displacement relative to the other phases. For example, the control signal may be converted to four signals having a quadrature relationship to one another. Each of the four signals may be introduced to a different switch and mixed with the input signal. A particular one of the switches passes a signal when the frequency and phase of the input and control signals introduced to the switch substantially coincide. An "or" network is provided to provide an output signal when a signal passes through any one of the switches.

The single FIGURE illustrates an electrical circuit constituting one embodiment of the invention.

In the single FIGURE, an input signal is provided on a line 10. The frequency of this input signal may be variable. The input signal on the line 10 is introduced to a plurality of resistances 12, 14, 16 and 18 each having a suitable value such as approximately 47 kilohms and each connected in a different branch.

A control signal is provided on a line 20. The control signal may be provided with the frequency which is to be detected. The control signal on the line 20 is introduced to a quadrature phase shifter 24 to produce on lines 26 and 28 signals such as square wave signals having a quadrature phase relationship to each other.

The signals from the line 26 are introduced to the cathode of a diode 30 and the anode of a diode 32. The anode of the diode 30 and the cathode of the diode 32 are respectively connected to gate electrodes of FET junction transistors 34 and 36. Similarly, the signals from the line 28 are introduced to the cathode of a diode 40 and the anode of a diode 42. The anode of the diode 40 and the cathode of the diode 42 are respectively connected to gate electrodes of FET junction transistors 44 and 46. FET junction transistors 34 and 44 are of the N channel type while FET junction transistors 36 and 46 are of the P channel type.

The second terminals of the resistances 12, 14, 16 and 18 are connected to the source electrodes of the FET junction transistors 34, 44, 36 and 46. Resistances 50, 52, 54 and 56 are respectively connected between the gate electrodes and the source electrodes of the transistors 34, 44, 36 and 46. Each of the resistances 50, 52, 54 and 56 may be provided with a suitable value such as 1 megohm.

The drain electrodes of the FET junction transistors 34, 44, 36 and 46 are connected to first terminals of capacitors 60, 62, 64 and 66, second terminals of which are connected to reference potentials such as ground. The capacitors 60, 62, 64 and 66 may have a suitable value such as 0.1 microfarads to provide particular time constants with the associated resistances 12, 14, 16 and 18. The drain electrodes of the transistors 34, 44, 36 and 46 are also respectively connected to cathodes of diodes 70, 72, 74 and 76. The anodes of the diodes 70, 72, 74 and 76 connect to the base of an NPN transistor 80. The collector of the transistor receives a positive voltage such as +15 volts and the emitter of the transistor receives a negative voltage such as −15 volts. The output of the circuit shown in the single FIGURE is taken from the emitter of the transistor 80.

The line 10 provides an input signal having a variable frequency. This signal is introduced to the source electrodes of the transistors 34, 44, 36 and 46. Each of the gate electrodes receives the control signals in a particular phase relationship. The signals introduced to the gate electrodes of the transistors 34 and 36 effectively have a phase relationship of 180° to each other because of the inverse connections to the diodes 30 and 32 and because they are opposite polarity transistors. The signals introduced to the emitter electrodes of the transistors 44 and 46 effectively have a phase relationship of 180° to each other because of the inverse connections to the diodes 40 and 42 and because they are opposite polarity transistors. Since the signals on the input electrodes of the diodes 30 and 32 have a 90° phase relationship to the signals on the input electrodes of the diodes 40 and 42, an effective quadrature relationship is provided between the signals on the gates of the FET transistors 34, 44, 36 and 46. The FET junction transistors have a virtual short from source to drain when the voltage from gate to drain is essentially zero. These transistors have a virtual open from source to drain when the gate to source voltage exceeds the pinch-off voltage. This voltage is negative for N channel devices and positive for P channel devices. The control signals appearing at the gate electrodes are of sufficient amplitude to turn the FET junction transistors "off" for one half of the appropriate quadrature control signal cycle. An example might be transistor 34 "off" from 0° to 180°, transistor 44 "off" from 90° to 270°, transistor 36 "off" from 180° to 0° and transistor 46 "off" from 270° to 90°.

The voltage appearing on the capacitor connected to the transistor drain, for example, the junction of 34, 60, and 70 will be the difference frequency between the signals at inputs 10 and 20. When the difference frequency is high, the amplitude of this signal will be near zero since it is filtered out by resistance 12 and capacitor 60. When the difference frequency approaches zero the voltage across capacitor 60 will be large and the instantaneous value will depend upon the relative phase of the control signal appearing at the gate and the input signal appearing at 10. If the transistor is "on" during the positive half cycle of the input signal the voltage at the junction of 34, 60 and 70 will be positive. If the transistor is "on" during the negative half cycle of the input signal the voltage at this junction will be negative.

As the phase between the input signal 10 and the control signal 20 varies through 360° the voltage appearing across the output capacitor will vary from zero to positive to zero to negative. Since each of the four transistors receives a control signal with a quadrature relationship, the voltages across the four output capacitors will also be in quadrature relationship. The four diodes 70, 72, 74 and 76 connect the output to the most negative capacitor. Thus, the presence of a signal on input 10 near the frequency of the control signal 20 and within the pass band of the filters, for example, resistance 12 and capacitor 60, will produce a negative voltage output signal.

The network formed by the diodes 70, 72, 74 and 76 has been designated as an "or" network only for the purpose of providing an understanding of the invention. Actually, the network formed by the diodes 70, 72, 74 and 76 may be considered as a majority network in the sense that the charge across one of the capacitances 60, 62, 64 and 66 is able to flow through its associated diode when the frequencies of the signals on the input lines 10 and 20 substantially coincide.

The system described above has certain important advantages. It provides an indication of the frequency on the line 10 when the frequency of the input signals on the line 10 approaches the frequency of the control signals on the line 20, regardless of any phase differences in the signals on the lines 10 and 20. Furthermore, the system provides an accurate indication of frequency regardless of any drifts in the values of such components as resistances and capacitances. This results from the fact that these components affect only the charge produced in the capacitance when the associated FET junction transistor becomes conductive.

It will be appreciated that the production of quadrature signals is only by way of illustration. Actually, any number of phase-displaced signals may be produced to accomplish the purposes of the invention. Preferably the number of phase-displaced signals produced from the signal on the line 20 should be at least three. By way of illustration, when three signals are displaced in phase from one another, the displacement in phase may be 120°. By increasing the number of phases, the output signal variations will be less as the phase relationship between the signals on the line 10 and the phase-displaced signals on the line 20 changes.

The system described above is also advantageous since it can be provided with a sharp bandwidth. This bandwidth is primarily controlled by the resistances such as the resistance 12 and the capacitances such as the capacitance 60. For example, the bandwidth of the detector may be nearly the same at 60 db attenuation as at 3 db attenuation. In this way, the frequency of the signal on the line 10 may be measured with more precision than in the prior art. The bandwidth can be further sharpened by cascading a plurality of RC stages corresponding to the resistance 12 and the capacitance 60.

It will be appreciated that the diodes 30, 40, 32 and 42 can be eliminated by producing four signals having a quadrature relationship in a phase shifting stage. When this occurs, the field effect transistors 34, 44, 36 and 46 can all be of one type such as an N channel.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for detecting at a particular frequency an input signal having a variable frequency, means for providing a control signal at the particular frequency, means responsive to the control signal for converting such signal into a plurality of signals each having a displaced phase relationship to the other signals, a plurality of switching means each responsive to an individual one of the phase-displaced control signals and to the input signal for providing an output signal in accordance with the frequency and phase relationships between the individual one of the phase-displaced control signals and the input signal, and an "or" network connected to the switching means in the plurality to pass the signals passing through the switching means in the plurality, the "or" network including a plurality of unidirectional means each associated with an individual one of the switching means and having characteristics of passing signals of only one polarity from the associated switching means and having an output common with the outputs of the other unidirectional means.

2. The combination set forth in claim 1, including a plurality of means each associated with a different one of the switching means for providing a particular time constant to control the passage of signals through the switching means and each connected to the associated one of the unidirectional means for introducing to the unidirectional means the signals passing through the associated switching means.

3. In combination for detecting at a particular frequency an input signal having a variable frequency, means for providing a control signal having the particular frequency, means responsive to the input signal for providing a plurality of control signals each having a quadrature phase relationship to the other control signals in the plurality, a plurality of switching means each connected to receive an individual one of the phase-displaced control signals and the input signal to produce a signal having an output in accordance with a particular relationship of frequency and phase between the individual ones of the control signals and the input signal, an "or" network having a plurality of members each connected to an individual one of the switching means and having a common output with the other members and having characteristics of passing only signals of one polarity to indicate the maximum amplitude of all of the signals passing through the switching means, and means responsive to the signals passing through the common output of the "or" network to provide an indication, through the amplitude of the signals passing through the "or" network, that the input signals has the particular frequency.

4. The combination set forth in claim 3, including a plurality of means each connected to an individual one of the switching means to provide a timing constant for the associated switching means to control the passage of signals through the switching means.

5. The combination set forth in claim 2 wherein each of the switching means includes an FET junction transistor and wherein the means providing a timing constant for each FET junction transistor includes a resistance and a capacitor connected in series with the FET junction transistor.

6. In combination for detecting at a particular frequency an input signal having a variable frequency, means for providing a control signal having the particular frequency, means responsive to the input signal for providing a plurality of control signals each having a particular displaced relationship in phase to the other signals in the plurality, a plurality of means for individually comparing the frequency and phase of each of the control signals with the frequency and phase of the input signal to produce a signal when the frequency and phase of the individual ones of the control signals correspond to the frequency and phase of the input signal, and output means operatively coupled to the comprising means and having a common output for providing an output indication at the common output when the comparing means produces at least one signal with at least a particular amplitude, the output means including a plurality of members each operatively coupled to an individual one of the comparing means and having characteristics for passing the signals from the associated one of the comparing means only when the signals have a particular polarity.

7. The combination set forth in claim 6 wherein the comprising means constitute switching means each connected to receive an individual one of the control signals and the input signal.

8. The combination set forth in claim 6 wherein the comparing means individually include a resistance and a capacitance in series and provided with a particular time constant to pass signals only when the frequency and phase of the individual ones of the control signals correspond to the frequency and phase of the input signal.

9. The combination set forth in claim 8 wherein the comparing means constitute FET junction transistors and wherein a resistance and a capacitance are in series with the FET junction transistor and wherein the FET junction transistor becomes conductive when the phase of the individual one of the control signals corresponds to the phase of the control signal.

* * * * *